US012515588B2

(12) United States Patent
Castroverde et al.

(10) Patent No.: US 12,515,588 B2
(45) Date of Patent: Jan. 6, 2026

(54) CAMERA MONITORING SYSTEM FOR MOTOR VEHICLES

(71) Applicant: Ficosa Adas, S.L.U., Barcelona (ES)

(72) Inventors: Lluís Gibert Castroverde, Viladecavalls (ES); Natalia Canosa Perez, Viladecavalls (ES); Noelia Rodriguez Ibañez, Viladecavalls (ES); Brenda Meza García, Viladecavalls (ES); Jordi Tenas Martínez, Viladecavalls (ES); Xavier Biosca Yuste, Viladecavalls (ES); Daniel Guerra Fagundez, Viladecavalls (ES)

(73) Assignee: FICOSA ADAS, S.L.U., Barcelona (ES)

( * ) Notice: Subject to any disclaimer, the term of this patent is extended or adjusted under 35 U.S.C. 154(b) by 900 days.

(21) Appl. No.: 16/910,980

(22) Filed: Jun. 24, 2020

(65) Prior Publication Data
US 2020/0401818 A1    Dec. 24, 2020

(30) Foreign Application Priority Data

Jun. 24, 2019 (EP) .................................... 19382531

(51) Int. Cl.
*B60R 1/26*    (2022.01)
*B60K 35/10*   (2024.01)
(Continued)

(52) U.S. Cl.
CPC ................ *B60R 1/26* (2022.01); *B60K 35/10* (2024.01); *B60K 35/22* (2024.01); *B60K 35/28* (2024.01);
(Continued)

(58) Field of Classification Search
CPC .............. B60R 1/12; B60R 2001/1253; B60R 2001/1284; B60R 2300/207; B60R 1/00;
(Continued)

(56) References Cited

U.S. PATENT DOCUMENTS 10,245,954 B2   4/2019   Shoji et al.
10,310,323 B1 * 6/2019   Koch .................... G02F 1/1368
(Continued)

FOREIGN PATENT DOCUMENTS

EP           2181892 A1 *  5/2010  ............. B60Q 9/005

OTHER PUBLICATIONS

Translation of EP2181892 (Year: 2010).*
(Continued)

*Primary Examiner* — Brandi N Thomas
(74) *Attorney, Agent, or Firm* — CANTOR COLBURN LLP

(57) ABSTRACT

A camera monitoring system is adapted for use in vehicles, and includes an image capturing means, a control unit, and at least one display device. The image capturing means is configured to capture an image from an external environment, and is associated with an exterior rear-view mirror of the vehicle. The unit is connected to the capturing means, and is configured to select an image region from the captured image. The image region is smaller than the captured image and is movable within the captured image. The device may be a touch screen, and the system may include a control surface in the touch screen configured to move via touches performed by a driver. The image region is displayed in the touch screen, or in another, additional, screen of the device. The system may further include a gesture detector for the detection of driver gestures associated with the image region.

21 Claims, 10 Drawing Sheets

(51) Int. Cl.
*B60K 35/22* (2024.01)
*B60K 35/28* (2024.01)
*B60R 1/12* (2006.01)
*B60R 1/27* (2022.01)
*B60R 1/28* (2022.01)
*G06F 3/0486* (2013.01)
*G06V 20/56* (2022.01)
*G06V 40/20* (2022.01)

(52) U.S. Cl.
CPC .................. *B60R 1/12* (2013.01); *B60R 1/27* (2022.01); *B60R 1/28* (2022.01); *G06F 3/0486* (2013.01); *G06V 20/56* (2022.01); *G06V 40/20* (2022.01); *B60R 2001/1253* (2013.01); *B60R 2001/1284* (2013.01); *B60W 2554/4048* (2020.02)

(58) Field of Classification Search
CPC ........ B60R 2300/105; B60R 2300/802; B60R 1/26; B60R 11/04; B60R 2300/8046; B60R 1/28; B60R 2011/004; G06F 3/0486; G06F 3/04845; G06F 3/011; G06F 3/017; G06F 3/0488; G06V 40/20; G06V 20/56; G06V 20/59; B60W 2554/4048; B60K 2370/1438; B60K 2370/176; H04N 23/632; H04N 23/69; H04N 23/90; H04N 23/633; H04N 23/631; H04N 23/57; H04N 23/60; H04N 23/695; H04N 5/2621; G06T 19/20; G02B 2027/0138
See application file for complete search history.

(56) References Cited

U.S. PATENT DOCUMENTS

| | | |
|---|---|---|
| 2007/0252822 A1 | 11/2007 | Kim et al. |
| 2013/0128047 A1 | 5/2013 | Lee |
| 2014/0350784 A1 | 11/2014 | Imai |
| 2015/0015710 A1* | 1/2015 | Tiryaki .............. H04N 5/23216 348/148 |
| 2015/0212647 A1* | 7/2015 | Kim ...................... G06F 3/1423 345/173 |
| 2016/0046188 A1* | 2/2016 | Wild ...................... B60K 35/00 701/36 |
| 2016/0196800 A1 | 7/2016 | Kim et al. |
| 2017/0023789 A1* | 1/2017 | Nakamura ............. B60K 35/00 |
| 2018/0134217 A1* | 5/2018 | Peterson ................ G06V 20/58 |
| 2018/0197508 A1* | 7/2018 | Chae ....................... H04N 5/44 |
| 2018/0201190 A1 | 7/2018 | O'Connell et al. |
| 2020/0215975 A1* | 7/2020 | Kunze .................. G06F 3/0488 |

OTHER PUBLICATIONS

Extended European Search Report for European Application No. 19382531.2; Date of Completion: Oct. 24, 2019; Date of Mailing: Oct. 31, 2019; 7 Pages.

* cited by examiner

CAMERA MONITORING SYSTEM FOR MOTOR VEHICLES

CROSS-REFERENCE TO RELATED APPLICATIONS

This application claims the benefit of European Application Serial No. 19382531.2 filed Jun. 24, 2019, the disclosure of which is incorporated herein by reference in its entirety.

BACKGROUND

The present invention has its application within the control systems for motor vehicles comprising electronic (interior and/or exterior) rear-view mirror assemblies.

The present invention relates to a camera monitoring system (CMS) to manage the field of view to be displayed in one or more rear-view mirrors of a vehicle.

Touch screens are largely known in the art. They have a spatially resolving sensor associated with a display surface, the sensor detecting a touch of the display surface, in particular at least one contact in precise positions by a finger, and so the interaction of the user with the displayed touch screen contents is possible.

US20130128047A1 discloses a touch type display mirror comprising a touch panel through which a user inputs a first signal, a photosensitive panel arranged on a rear surface side of the touch panel, and a display arranged on a rear surface side of the photosensitive panel and including a signal processing unit processing the first signal that is input from the touch panel, wherein the signal electronic processing unit (ECU) is connected to an angle-adjustable rear view camera and adjusts a shooting angle of the angle-adjustable rear view camera according to a second signal that is input from the touch panel. Thus, a mechanical actuator is includes to change the position (shooting angle) of the exterior rear view camera, where the mechanical actuator is in charge of the activation/deactivation of the camera based on the signal from the ECU which, in turn, connects to a touch panel, from where the driver enters the desired position of the rear-view by touching the screen.

A problem of the prior art is that a mechanical actuator is needed, which means cost, complexity and likelihood of damage over time.

Therefore, it is highly desirable to provide a motor vehicle with a control system monitoring the intelligent rear-view mirror system(s) to change the field of view of the rear-view mirror(s) without any mechanical actuator.

BRIEF DESCRIPTION

The present invention solves the aforementioned problems and overcomes previously explained state-of-art work limitations by providing a camera monitoring system for motor vehicles, configured to display images captured from (an exterior and/or side) rear-view mirror of the motor vehicle into a control surface located inside the motor vehicle (e.g., on a screen located at an interior surface of the door visible for the driver). The proposed camera monitoring system (CMS) is capable of managing the field of view (FOV) of the means for capturing images (e.g. a camera of the rear-view mirror) and changing at least this field of view without any mechanical actuator.

The proposed CMS is capable of managing the FOV of the rear-view mirror, e.g. by touching a control surface without dirtying the screen of the display provided by the rear-view mirror. The control surface may be any surface that allows the user to manage the field of view of the image capturing means (e.g., the camera) by touching the surface (e.g., another display, another section of the display, etc.), the CMS using any touch detection technology.

Furthermore, the proposed CMS can manage the FOV of the rear-view mirror even without touching the control surface (i.e., through a touchless screen), for example, by gestures, using any gesture detection technology. The touchless control surface may be implemented in different ways such as: i) by increasing the capacity sensibility of the screen (no camera is used), ii) by using a camera based on image-classifiers.

The change of the FOV displayed may be performed by the CMS only in predetermined conditions. For example, the field of view can only be changed when the motor vehicle is stopped (i.e., not moving). In order to find out whether the vehicle is moving or not, the CMS can use the electronic control unit (ECU) of the vehicle, which is connected to the communication bus (e.g. CAN) of the vehicle. Alternatively, determining if the motor vehicle not moving can also be done by using at least one camera which takes a plurality of frames (images) and a control unit which compares the frames (current frame vs. previous frame) to determine if the difference between frames is enough to decide that there is a movement.

An aspect of the present invention refers to a camera monitoring system for motor vehicles which comprises:
  Image capturing means (e.g., cameras) being associated with at least an exterior rear-view mirror of a vehicle. In the context of the invention, the exterior rear-view mirror refers to a mounting assembly (e.g., a winglet or a sharkfin) located at an exterior part of the vehicle and where the image capturing means are located/mounted. The image capturing means are configured to capture an image from an exterior field of view of the vehicle, the field of view (FOV) extending at least sideward and rearward outside the vehicle and encompassing a portion of the exterior part of the vehicle (preferably an exterior lateral part or side of the vehicle).
  An electronic control unit or ECU, which is connected to the image capturing means. The ECU is configured to select at least an image region (or image section) from the image captured by the image capturing means. The image region selected by the ECU is smaller than the image captured by the image capturing means. And the selected image region can be moved within the captured image.
  At least one display device located inside the vehicle and connected to the ECU. The display device comprises at least one screen. The, at least one, screen of the display device can be a touch screen and, in this case, the camera monitoring system further comprises a control surface in the touch screen configured to move the image region displayed by the, at least one, display device (in said screen or in another screen of the display device). Additionally, or as an alternative option, the camera monitoring system further comprises a gesture detector to move the displayed image region.

Another aspect of the present invention refers to a motor vehicle comprising two camera monitoring systems (CMS) as described above, wherein one CMS is located on the left side of the vehicle (with image capturing means associated with the exterior rear-view mirror(s) of the left side), and the other CMS is located on the right side of the vehicle (with image capturing means associated with the exterior rear-view mirror(s) of the right side), and further comprising an interior rear-view mirror system, and the ECU of the vehicle being the one controlling all the two camera monitoring and the interior rear-view mirror systems.

The present invention has a number of advantages with respect to prior art, which can be summarized as follows:
- The present invention allows a vehicle vision system capable of adapting the displayed images in function of user setting and/or current driving information.
- The present invention allows the FOV adjustment of the exterior cameras, which are fixed on the body of the vehicle, without the need of actuators or mechanical movements on these cameras.
- The present invention allows the size reduction of the side mirror, because the mirror element of the side "mirror" can be avoided, and it is well-known that a camera may be smaller than the entire mirror surface that reflects light. Moreover, screens in the exterior are avoided, since the location of the screen (display) is changed from the exterior to the interior (e.g. the screen is located inside the car, preferably on the door).
- The present invention allows the control be performed using a multi-touch-sensitive display adapted to detect gestures. The control actions are then triggered by the driver's gestures, instead of pushing digital buttons (overlays) on top of the displayed image, or instead of touching the display with fingers (which get the screen dirty), and a larger area of action is provided, that is, the driver can make the relevant gesture (with his/her head or fingers) in the air and not in a small/limited-size screen.

These and other advantages will be apparent in the light of the detailed description of the invention.

BRIEF DESCRIPTION OF THE DRAWINGS

For the purpose of aiding the understanding of the characteristics of the invention, according to a preferred practical embodiment thereof and in order to complement this description, the following Figures are attached as an integral part thereof, having an illustrative and non-limiting character.

DETAILED DESCRIPTION

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention. Also, description of well-known functions and elements are omitted for clarity and conciseness.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

Figure 1:
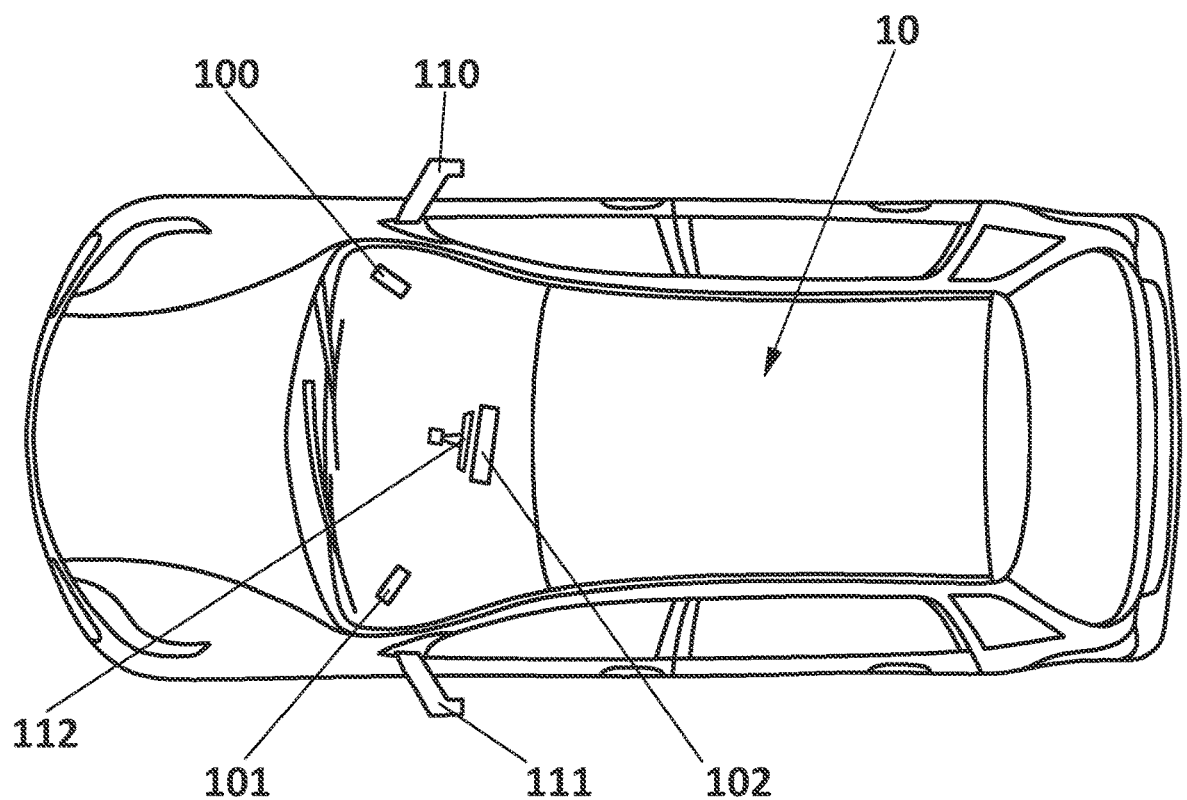
FIG. 1 shows a motor vehicle with a camera monitoring system, CMS, using two exterior rear-view mirrors or winglets and three interior displays, according to a possible embodiment of the invention.

FIG. 1 presents a motor vehicle (10) with a camera monitoring system, CMS, which comprises image capturing means (e.g., a camera) configured to captures images, the image capturing means being associated with an exterior mounting assembly (e.g., a winglet or a sharkfin), the mounting assembly being located at an exterior part of the (body side of the) motor vehicle (10). The image capturing means can be located, even fixed, outside the vehicle (10). The image capturing means are configured to capture an image from an exterior field of view of the motor vehicle (10), wherein the field of view extends at least sideward and rearward outside the vehicle (10). This field of view also encompasses a portion of the exterior side part of the vehicle (10) body at which the mounting assembly is located. Preferably, the image capturing means can capture afield of view extended at least 20 meters rearward and 4 meters sidewards.

For example, FIG. 1 shows two exterior rear-view mirrors (110, 111) at each side of the motor vehicle (10) and an interior rear-view mirror (112). Any of the exterior rear-view mirrors (110, 111) can be a (mechanically) mobile winglet or can be fixed (not mobile). In the case of being fixed, one option is to use a (i) winglet, which may be extendible; or (ii) a "sharkfin", more specifically, having two cameras (one for the top-view and one for the CMS) in the same mounting assembly housing. The CMS for the vehicle (10) shown in FIG. 1 comprises image capturing means located outside and associated with the exterior rear-view mirrors (110, 111); there is no image capturing means for the interior rear-view mirror (112).

The CMS further comprises an electronic control unit or ECU connected to the image capturing means, configured to select an image region from the image captured by the image capturing means. The image region is smaller than the captured image; i.e., is obtained by cropping the image from the image capturing means.

The CMS further comprises at least one (first) display device (100, 101, 102) located inside the motor vehicle (10), for example as shown in FIG. 1, and connected to the electronic control unit. The ECU inputs the image region into the display device (100, 101, 102) to be displayed as a cropped image instead of displaying the entire captured image. That is, the ECU does not input the whole captured image into the display device (100, 101, 102). Moreover, said image region can be moved within the captured image in response to a user's action, which can be: i) a touch by the user on a control surface of the display device (100, 101, 102) and/or ii) a gesture made by the user to a gesture detector that can be implemented in said display device (100, 101, 102) or by another device using any gesture detection technology. This enables a variety of interactive options for the driver.

The control surface can be implemented in a touch screen (200) of the (first) display device (100, 101, 102) preferably working as a multi-touch-sensitive display configured to receive a user's touch so as to move the image region within the captured image.

Preferably, the touch screen (200) is configured to detect different places touched simultaneously, in particular by a finger. The multi-touch-sensitive display allows tracking of images and touch carried out not only by one finger, but also complex actions, requiring operation with two or more fingers, can be performed. With particular advantage, the multi-touch-sensitive display may be further provided with a magnification of image regions by using two fingers and a change in the spacing of the fingers during contact is adjustable. In particular, together with the panning, a simple adjustment of the desired composition including the zoom level (zoom in/out) can be given by simple movements of the fingers. Therefore, the CMS comprises an associated touch screen controller configured to detect also movements and/or touches of one or more fingers by increasing the sensitive capacity of the touch screen (200).

In the case of exterior rear-view mirrors (110, 111) and/or wing mirrors, as shown in FIG. 1, the touch screen (200), in an interior part of the motor vehicle (10), can be provided for only one of the exterior (or wing) rear-view mirrors (110, 111). Through this touch screen (200), at least one parameter of the one exterior rear-view mirror (110, 111), in particular an operation parameter related to pivoting of the external camera and/or presentation parameters of an image section/region of the image captured by the external camera, can be adjusted.

In another embodiment, the touch screen (200) can be additionally arranged for an interior rear-view mirror (112) in an interior part of the motor vehicle (10). Typically, the interior rear-view mirror (112) and the exterior rear-view mirrors (110, 111) are connected through the ECU of the vehicle (10).

The multi-touch-sensitive screen (200) of the display device (100, 101, 102) can be configured to be an "only-touch" screen. That is, instead of having a "touch and drag" screen, the CMS provides the touch screen (200) with two different portions as the ECU (500) distinguishes: a first portion of the touch screen (200) in which the user/driver is not enabled to perform "touch and drag" of the displayed image, and a second portion in which the user/driver can perform normally the "touch and drag" operation provided by the multi-touch-sensitive screen (200).

According to this example, the user can perform only "touch" in the first portion or "touch & drag" in the second portion. The technical advantage of doing so is that the first portion does not get dirty. In this example, the light (image) received by the second portion comes from the same image of the display as the first portion. Preferably, the first portion is larger than the second portion. Preferably, the area of the second portion is approximately 30% of that of the first portion. Preferably, the length of the second portion is 20% of the length of the first portion, the length being defined along an X (horizontal) axis.

Figure 2:
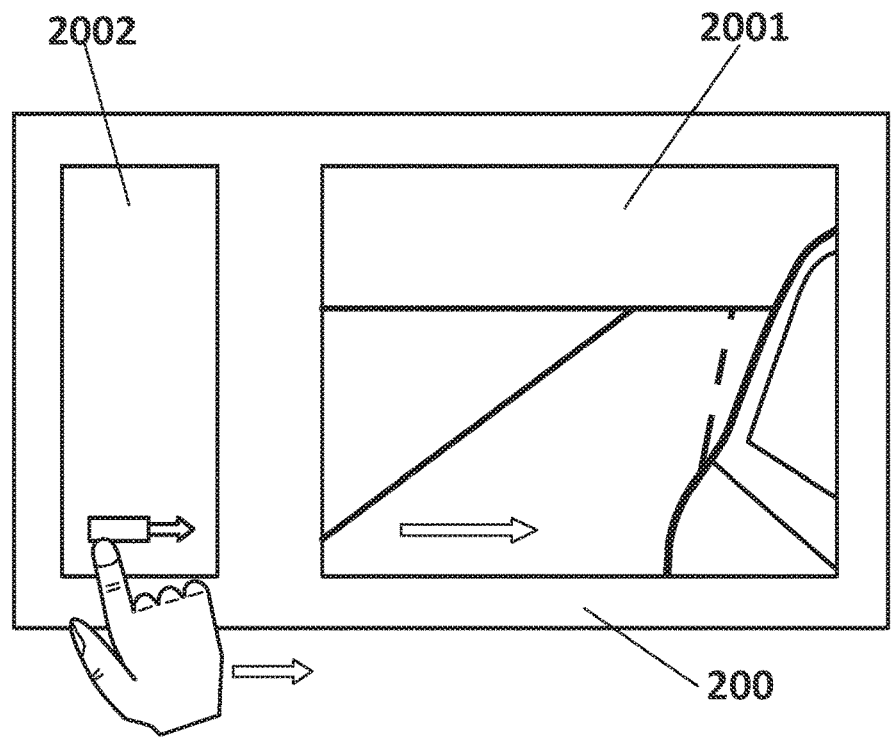
FIG. 2 shows a schematic representation of a touch screen in one of the displays split into two portions by the ECU for the CMS, according to a possible embodiment of the invention.

Therefore, instead of having a screen on each side (on the inside of the door) of the vehicle (10) and the screen being totally "touch and drag" for its whole surface, according to a possible embodiment, a single touch screen (200) on each side of the vehicle (10) is connected to the ECU (500), which distinguishes between a first portion (2001) and a second portion (2002) of the touch screen (200), as shown in FIG. 2. The ECU deactivates the first portion (2001) of the touch screen (200) so that the user cannot do the "touch and drag" in said first portion (2001) working as an "only-touch" screen, while the "touch and drag" is activated by the ECU only in the second portion (2002). According to another embodiment, the ECU can even deactivate the entire "touch" function in the first portion (2001) of the touch screen 200). The user is enabled to use the second portion (2002) to adjust the FOV and the brightness and/or contrast and/or color parameters of the image region displayed in the first portion (2001).

Figure 3:
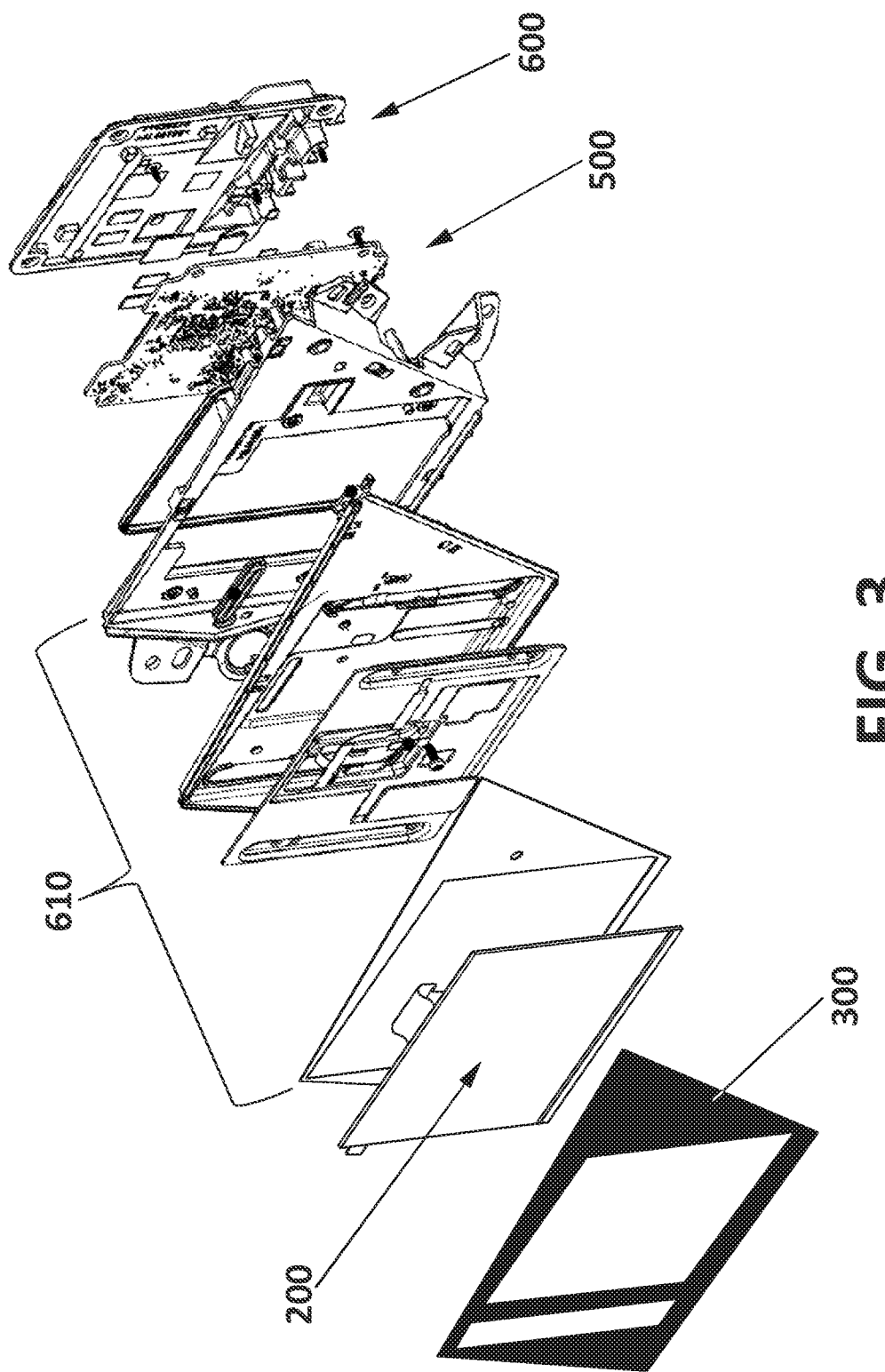
FIG. 3 shows an exploded view of the display with a touch screen and a frame cover, according to another possible embodiment of the invention.
Figure 4:
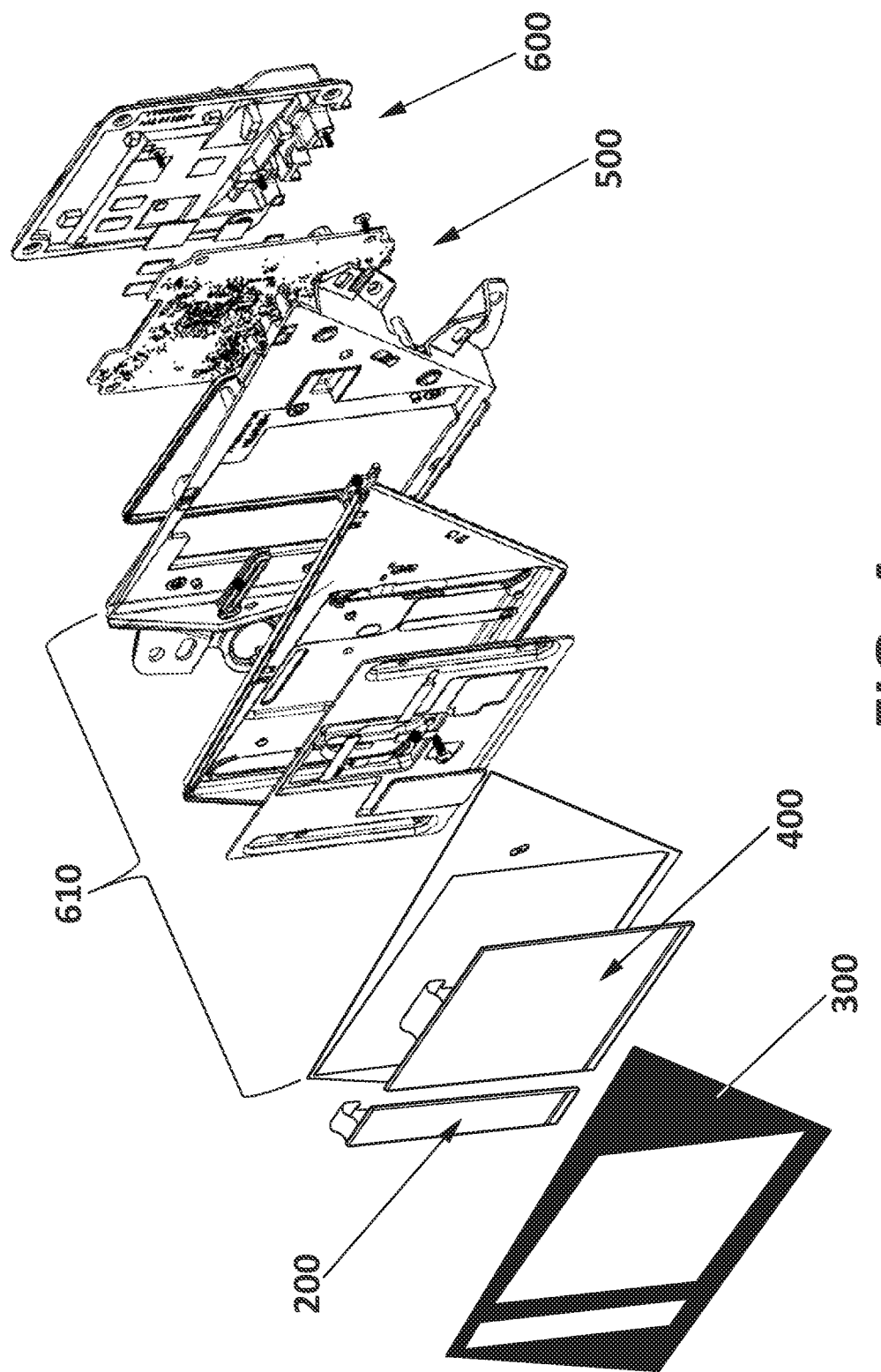
FIG. 4 shows an exploded view of the display with a touch screen and a touchless screen, and a frame covering both screens, according to a further possible embodiment of the invention.

In a preferred embodiment, in order to implement the aforementioned two portions (2001, 2002) in the first display device (100, 101, 102), the CMS further comprises a frame (300) covering partially the first display device (100, 101, 102), as shown in FIGS. 3-4. For example, on the inner side of a door of the vehicle (10), there can be a housing (600), which is adapted to be coupled with fixing means (610), to fix a controller or ECU (500), a touch screen (200) and the frame (300), to the door or anywhere inside the vehicle (10). Thus, the order of location of these different elements is as follows: first, housing (600); second, the ECU (500); third, the fixing means (610) belonging to the enclosure; fourth, the screen (200), or screens (200, 400), of the display device (100, 101, 102); and finally, the frame (300) covering the whole display device and showing the part(s) of the screen(s) which can be seen by the user.

This frame has the same dimensions as the touch screen (200) or significantly larger to cover at least the entire touch screen (200). The frame is a cover, preferably made of plastic or glass, which also protects the display device (100, 101, 102) from impacts and damages, since the touch screen (200) is relatively fragile. The frame is partially tinted. Preferably, the tinting is black. Said frame does not allow all the light emitted by the touch screen (200) can pass. Therefore, the driver does not see the light emitted by the display where the frame is tinted, i.e., silkscreen. The frame is placed, for example, on top of the touch screen (200), and so what the user sees is the "frame", since it is placed between the screen and the user.

As described before, the frame can be partially tinted; more particularly, comprising a (first) section that is not tinted, while the rest of the frame is stained. The transparent or non-tinted portion of the frame, from which the light of the display comes out and becomes visible by the user, can present different forms. Therefore, only the section of the frame (image) that is not tinted is shown/perceived to/by the user, but not all the image emitted by the display. According to a non-limiting example, as shown in FIG. 3, (the first)

non-tinted section of the frame has a size of approximately 60% of the total screen (200) and, preferably, its geometry (200) is rectangular. The geometry of the non-tinted section is purely aesthetic.

The ECU (500) deactivates the first portion of the touch screen (200) according to the specific geometry of the (first) non-tinted section of the frame.

According to another possible embodiment, the first display device (100, 101, 102) has an additional, second screen (400) in addition to the multi-touch-sensitive screen (200). Having two screens, as shown in FIG. 4, the first portion (2001) distinguished by the ECU (500) can be implemented in the second screen (400), which can be touchless and then cheaper, and the second portion (2002) in the touch screen (200) without requiring to deactivate the "touch and drag". And also, this second portion (2002) implemented in the touch screen (200), preferably smaller than the touchless screen, can display the parameters related to brightness and/or contrast and/or color of the additional screen to be adjusted by user's touch. One technical advantage is the cost of non-touch-sensitive screens. The additional screen (400) only displays the image region selected by the ECU (500) from the images captured by the image capturing means. In this case, the controller or ECU (500) can manage the image movement (i.e., "pan") of the image region displayed in the first portion (2001) based on the data or instructions captured in the second portion (2002) by the touch screen (200).

In a further possible embodiment, the CMS can take advantage of the second portion (2002) (implemented in a single touch screen (200) or in an additional screen as described before) to indicate a Blind Spot Detection or BSD, i.e., if an object is detected in the blind spot, the CMS turns on an indicator (triangle, exclamation, etc.) in said second portion (2002) of the first display device (100, 101, 102).

The CMS can be additionally provided with at least one (second) display device (another touch screen) to display parameters of the first display device (100, 101, 102), i.e., operation parameters of the touch screen (200). The first display device (100, 101,102) itself can also display the parameters to be adjusted. More particularly, the touch screen (200) allows the user by his/her touch to set brightness and/or contrast and/or color parameters of the first display device (100, 101, 102). Therefore, parameters are adjustable directly on the touch screen of the display device with respect to the optical impression of the image display parameters shown on the display. The driver can make the image lighter or darker, to choose contrast and other common parameters, in particular color-related parameter set of the images displayed in the touch screen (200). In a possible embodiment, the CMS is designed for inserting or superimposing a slider bar for the presentation parameters on the display device.

Additionally, at least one operating parameter of the first display device (100, 101, 102) can be used by the CMS to output an item of information and/or a warning, in particular to be used by a driver's assistance system (e.g., a lane change assistance system and/or a blind spot assistance system and/or parking assistance and/or a reversing assistance system) provided in the vehicle (10). The output of this information and/or a warning is adjustable depending upon an input on the touch screen (200).

Additionally, at least one item of additional information can be superimposed into the image displayed on the touch screen (200) and can be moved, by interaction at the display location of the additional information in the touch screen (200). In another embodiment, context-sensitive menus of items which can be activated by the touch screen (200) and displayed on the display device (100, 101, 102).

The ECU (500) or control unit can provide some digital buttons to be overlaid on the image shown in a second portion (2002) of the touch screen (200). For example, after selecting a specific adjustment possibility which can be done through a menu and/or a depicted control, thus a slider is displayed on the control surface of the touch screen (200), which can be gripped, for example by contact at the position of the slider and manipulated to adjust the display parameters. Of course, other possibilities are conceivable to make the presentation parameter set, for example with "+" and/or "−" labeled on the display area on-screen controls that trigger corresponding to an increase or decrease of the presentation parameter if a touch is sensed (zoom function). Particularly advantageously, it is also when the touch screen (200) can also be used to set further parameters. The control unit can be configured to form a touch screen menu on the screen (200). Thus, when the menu is selected by a touch, a menu can be displayed, which allows the setting of parameters of the winglet. The driver can touch with a finger (or with a pen) the image portion on one of the labelled symbols and cause a setting menu open different options (or additional information) in the image portion. Therefore, overlaid symbols are then placed with a menu having multiple menu items related to display parameters; in particular, for contrast, brightness and color parameters. It is also conceivable that by tapping the touch screen shown outside controls/menu items return to the default display. Additionally, touching the additional information can result in a corresponding menu with settings concerning the lane change assistant, i.e., in particular operating parameters of the lane change assistant.

Figure 5:
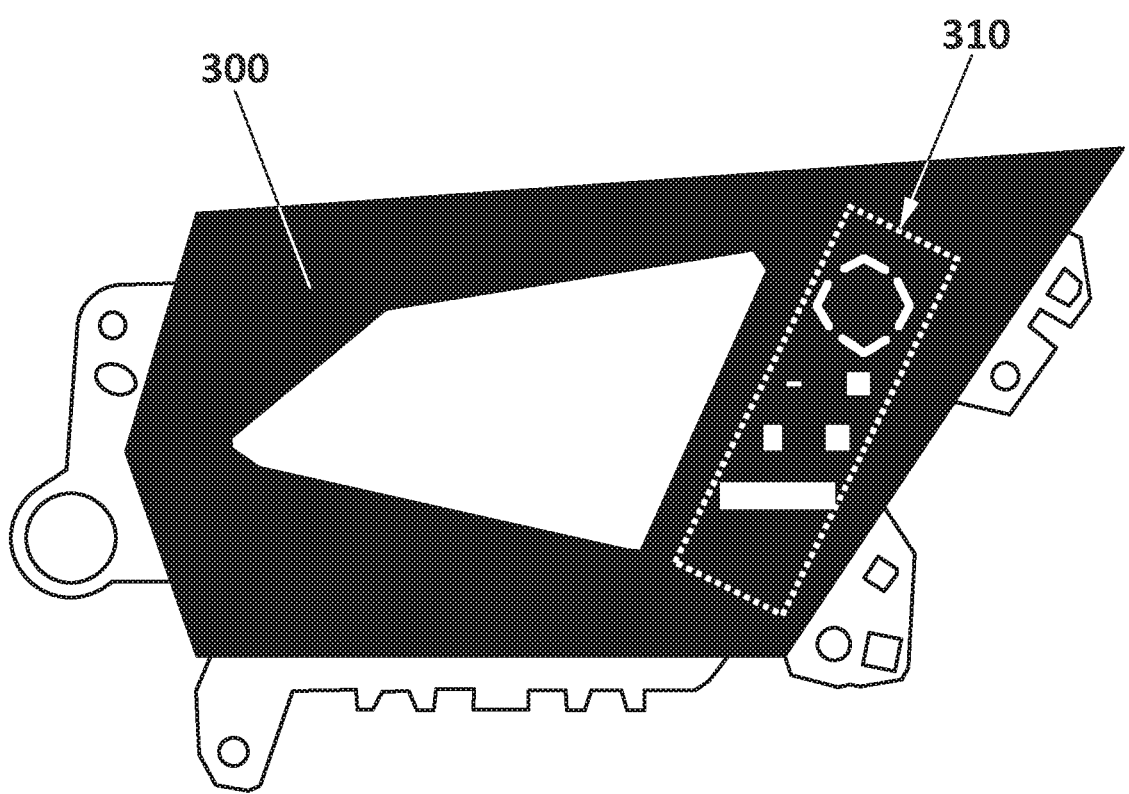
FIG. 5 shows a frame with screen printed buttons for the camera monitoring.

Another option is to draw (or taint) buttons (310) on the frame (300), as depicted in FIG. 5, so that the user can touch the drawn button (the button is not a mechanical component that moves) to trigger digital buttons on the screen (200).

According to an example, the frame and the screen (200) are together and in contact. According to another example, there is a gap between the frame and the screen (200) and preferably the gap is between 0.5 mm-4 mm. According to a further example, a joystick including the typical mouse ball (not optical) for computers or physical push buttons can be used. The joystick and/or the push buttons can be located anywhere the driver has access when driving; for example, on the door, on the dashboard (central console), on the steering wheel, etc. The push buttons can have a cross-shaped distribution, in order to move up/down/left/right. The joystick can have a cross or circular movement which allows the image to be moved according to the movement of the joystick. Switches or auxiliary pushbuttons can allow the user to choose between the different options (e.g., left or right CMS). A trackball can also be used, which allows greater precision in adjusting the position of the image since the trackball detects small movements of the ball. Also, a touchpad can be used, as the press of a button can be simulated by pressing the touchpad, so that the user can move the finger across the length and width of the pad to determine the movement of the image. Other types of elements sensitive to human touch such as plastic material or smart textiles can be used. All these above-mentioned elements can be placed in different elements of the car, (without being limiting): door, driver's side panel, center console, central tower (central armrest), steering wheel, etc.

Figure 6:
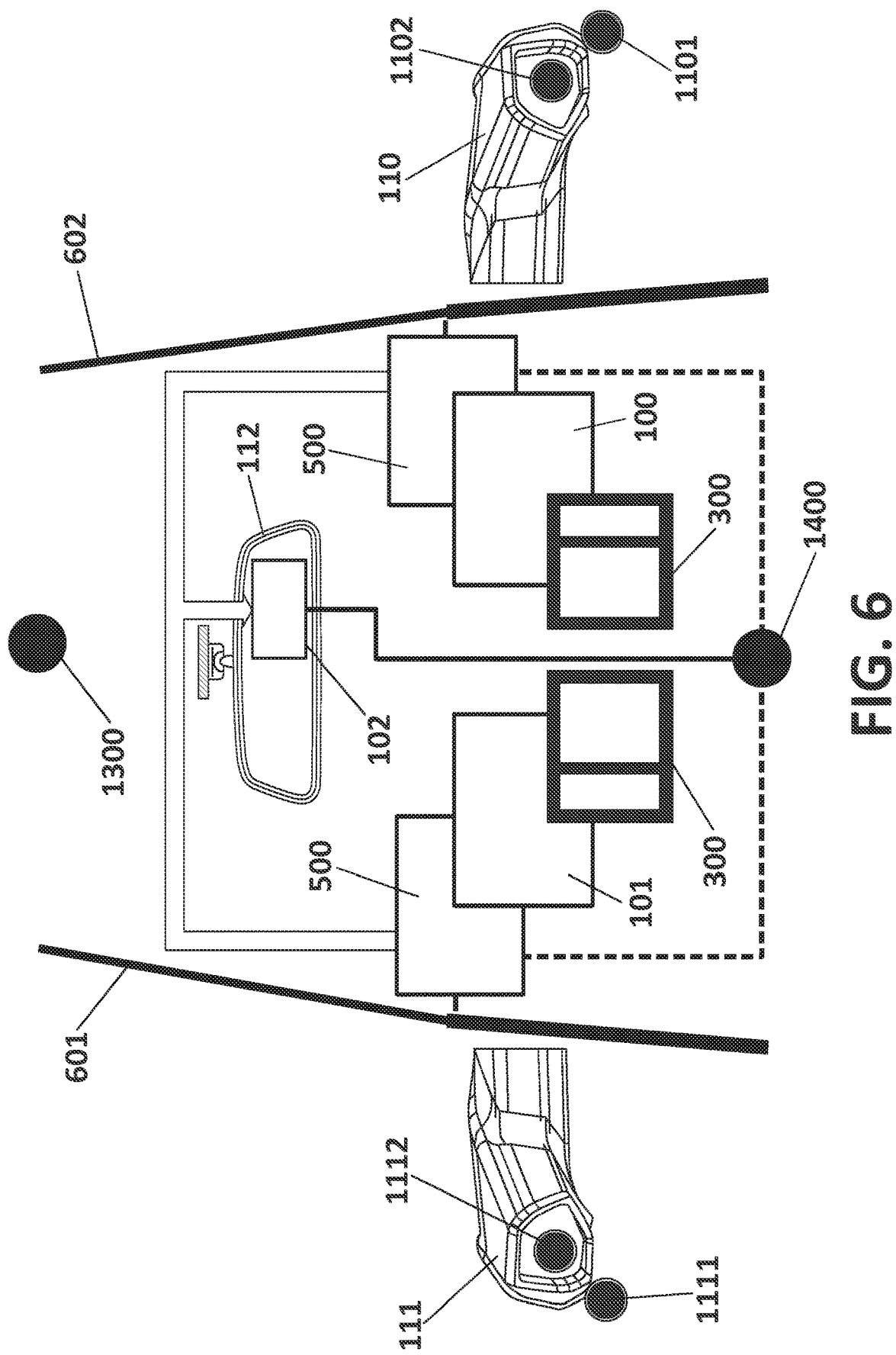
FIG. 6 shows a block diagram representing the CMS components, according to a preferred embodiment of the invention.

FIG. 6 shows the image capturing means used by the CMS, which can be an external camera (1102, 1112) rearwardly oriented and located at opposite sides (outside) of the vehicle (10), for capturing the external environment. Each CMS camera (1102, 1112) is fixed on an exterior rear-view mirror (110, 111) which is a winglet, and preferably the winglet is fixed to the outside of the car door (601, 602). In addition, the winglets at both side of the vehicle (10) incorporate respective top-view cameras (1101, 1111), but none of them are used by the CMS. Moreover, the vehicle (10) has a front camera (1300) and rear camera (1400), used by the ECU (500) to do the top-view by stitching. In a particular example, only one display device (101) associated with one of the corresponding winglets, in Europe and the Unites States only the left exterior rear-view mirror (111), is actually reached by the driver. Thus, it is particularly advantageous if a touch screen (200), e.g. of the left display device (101) can control the image region, e.g. the field of view adjustment, displayed in another screen/portion of the left display device (101).

Figure 7:
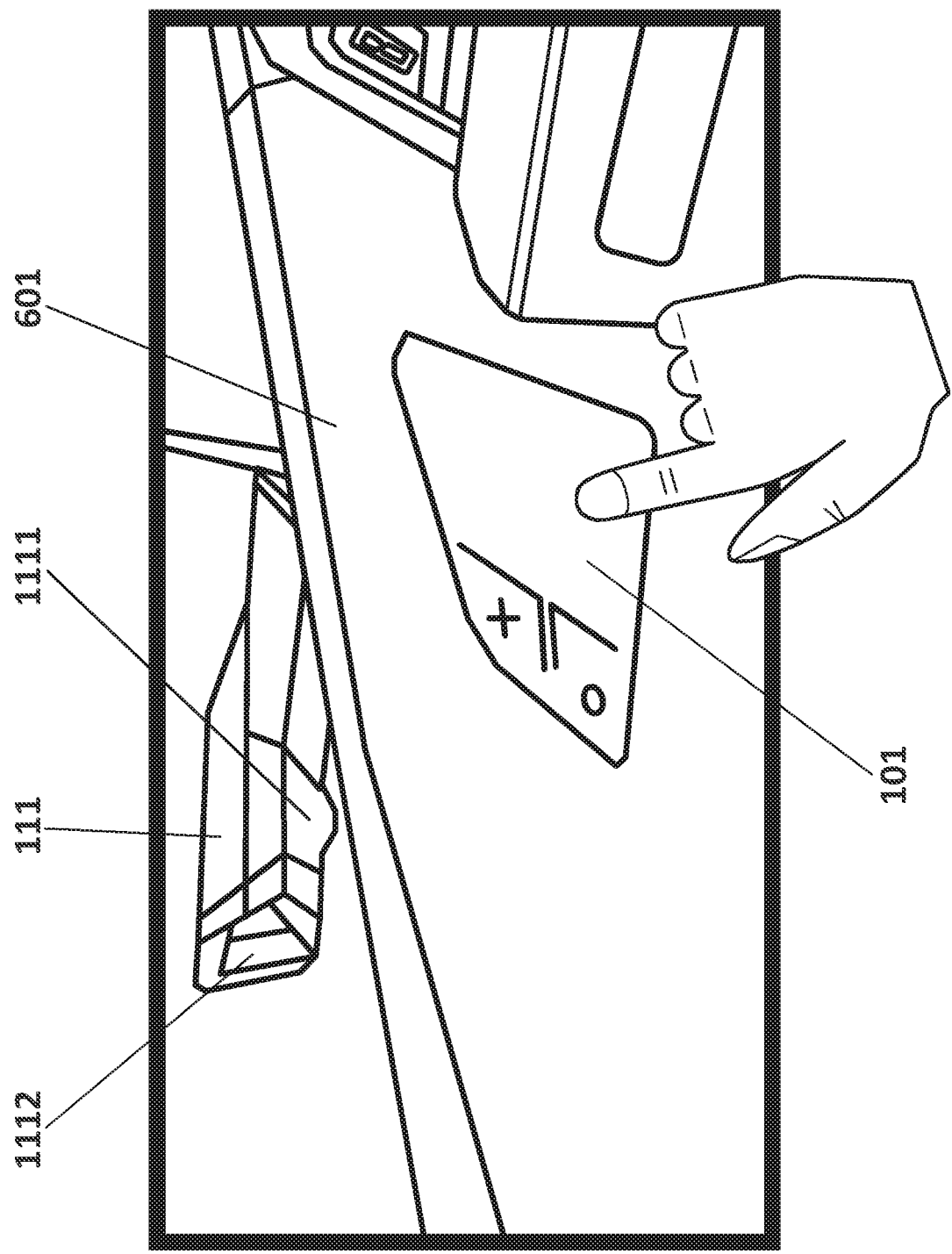
FIG. 7 shows the left exterior winglet and the associated interior display, according to a possible embodiment of the invention.

More particularly, FIG. 7 shows the left exterior rear-view mirror (110) which is a winglet fixed on the outer side of the left door (601) and incorporates two fixed cameras: a first camera down for the top-view (1111) and a second camera focused back for the CMS (1112). The left display device (101) is fixed on the other, the inner, side of the left door (601) so that the user, the driver usually, can adjust the FOV of the CMS camera by touches. The top-view camera (1111) is usually positioned with a relative angle (e.g., around 2°-20°) from the perpendicular to the ground and said angle varies according to the model of the vehicle (length of the car, height of the car, shape of the external surface where the mounted assembly housing is placed on, e.g., shape of the door, etc.).

In a possible embodiment, each—right, left—winglet of the CMS can comprise:
a) a camera focused sensibly backwards, which is the so-called—right, left—CMS camera (1102, 1112);
b) a camera focused sensibly down, which is the—right, left—top-view camera (1101, 1111);
c) a camera focused sensibly forward, which is useful, for example, when the driver overtakes. Especially when he/she overtakes the vehicle in front on the right, there is no visibility of what is ahead (e.g. in the area adjacent in front of the vehicle); then, thanks to this front camera, the image of what is ahead can be displayed in the second portion (2002), preferably displayed by a second screen (400).

Figure 8:
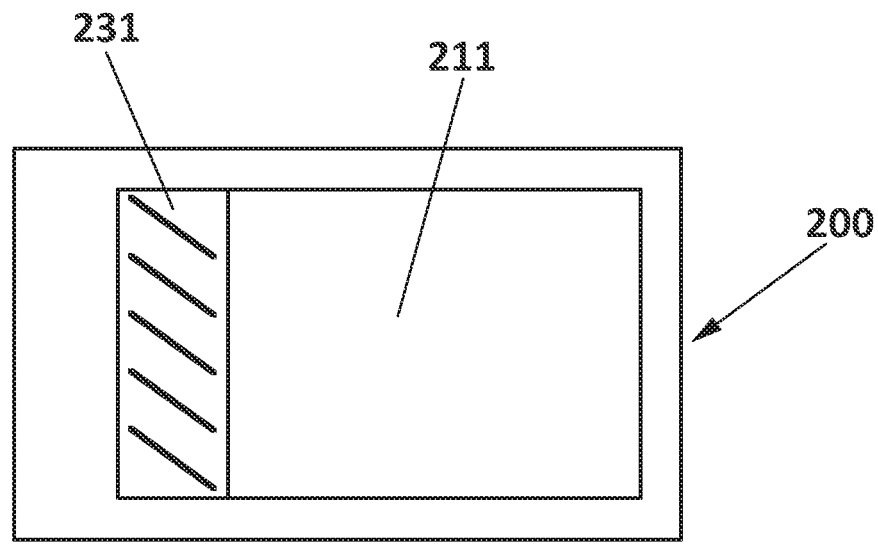
FIG. 8 shows a schematic representations of a first image section controlled by the CMS of the image to be displayed.
Figure 9:
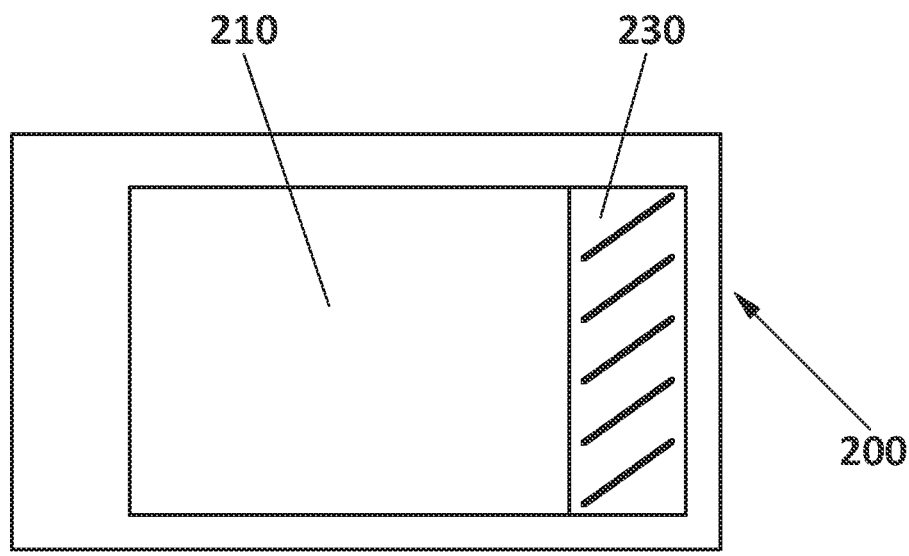
FIG. 9 shows a schematic representation of a second image section controlled by the CMS of the image to be displayed.

FIG. 8 shows the touch screen (200) of the left display device (101) normally used by the driver, while FIG. 9 shows the touch screen (200) of the right display device (100), typically fixed at the co-driver's side. The second portion of the display devices (100, 101), implemented in the touch screen (200), displays an image region (210, 211) of the image captured by the respective external CMS cameras (1102, 1112). A zoom level of the image region (210,211) is adjustable by positioning two fingers on the touch screen (200) and changing the distance between the fingers whilst touching.

Figure 10:
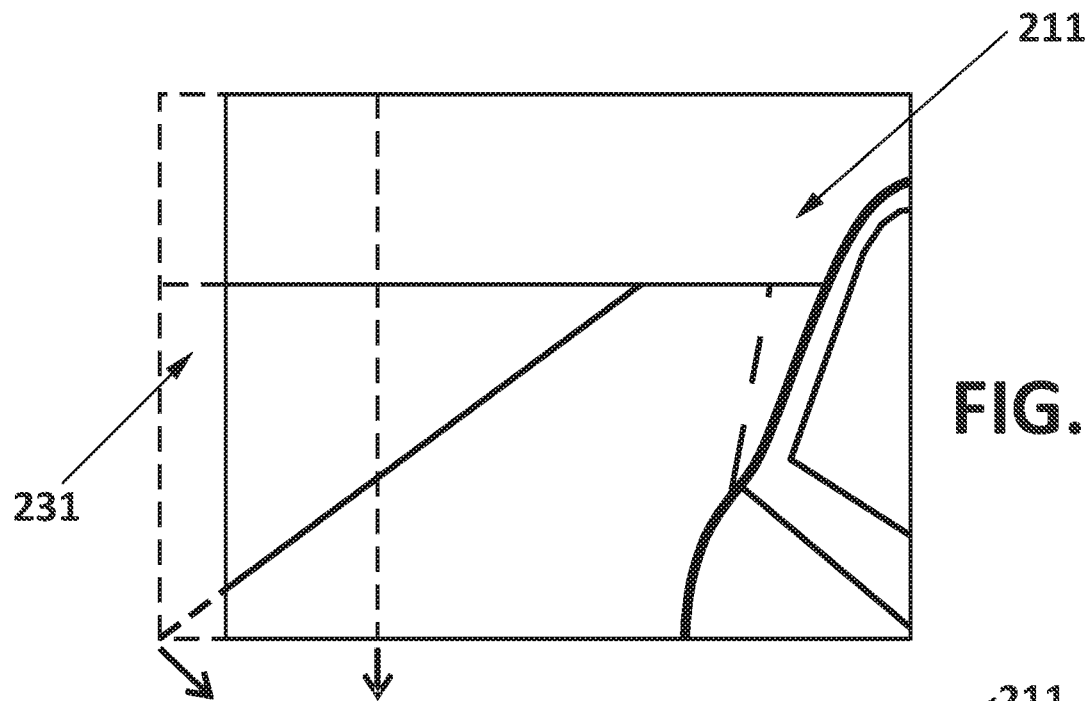
FIG. 10 shows a schematic representation of a third image section controlled by the CMS of the image to be displayed.
Figure 11:
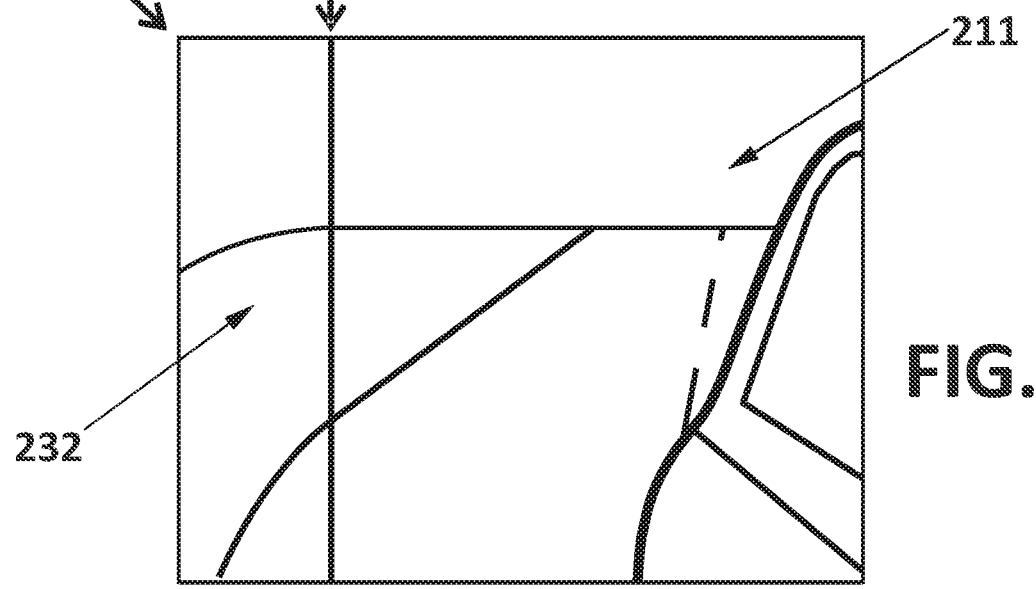
FIG. 11 shows a schematic representation of a fourth image section controlled by the CMS of the image to be displayed.

Optionally the image region (211) displayed in the second portion of the left display device (101) may further comprise an additional image section (232), as shown in FIG. 11, obtained by the ECU (500), which selects the extreme side of the image (231), shown in FIG. 10, captured by the left external CMS camera (1112) and reduces its width. Thus the additional image section (232) shown in FIG. 11 corresponds to the narrowed image of the extreme side of the captured image (231) shown in FIG. 10, increasing significantly the FOV of the left external CMS camera (1112) simulating an aspherical view mirror in the left exterior rear-view mirror (110). The same effect of outer aspherical view mirror can be achieved in the right exterior rear-view mirror (100) for the co-driver, displaying a second additional image section (230) corresponding to a narrower image of the extreme side from the image captured by the right external CMS camera (1102).

Figure 12:
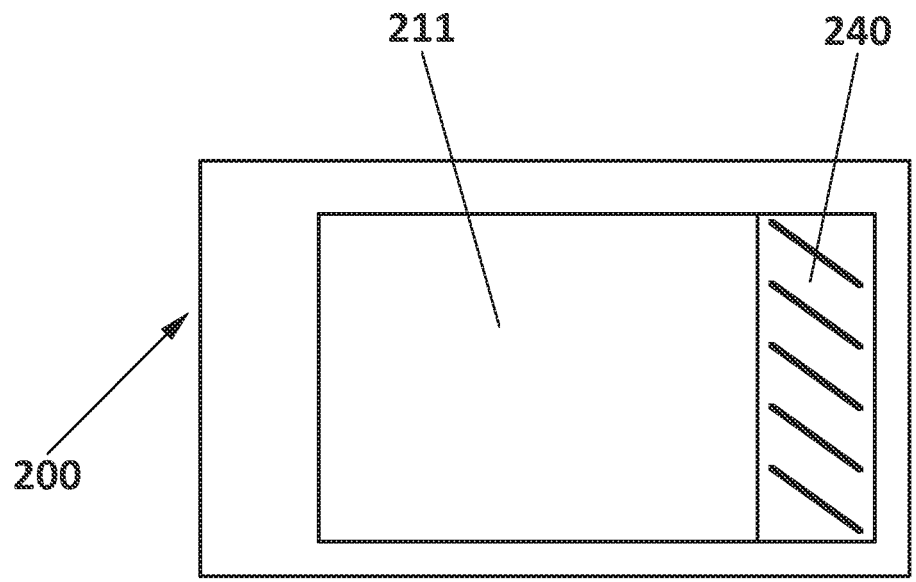
FIG. 12 shows a schematic representation of a fifth image section controlled by the CMS of the image to be displayed.
Figure 13:
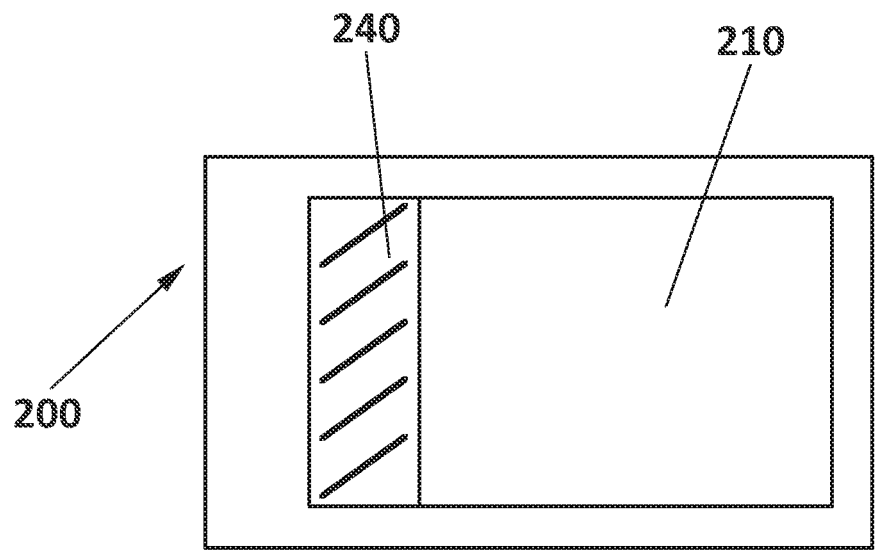
FIG. 13 shows a schematic representation of a sixth image section controlled by the CMS of the image to be displayed.
Figure 14:
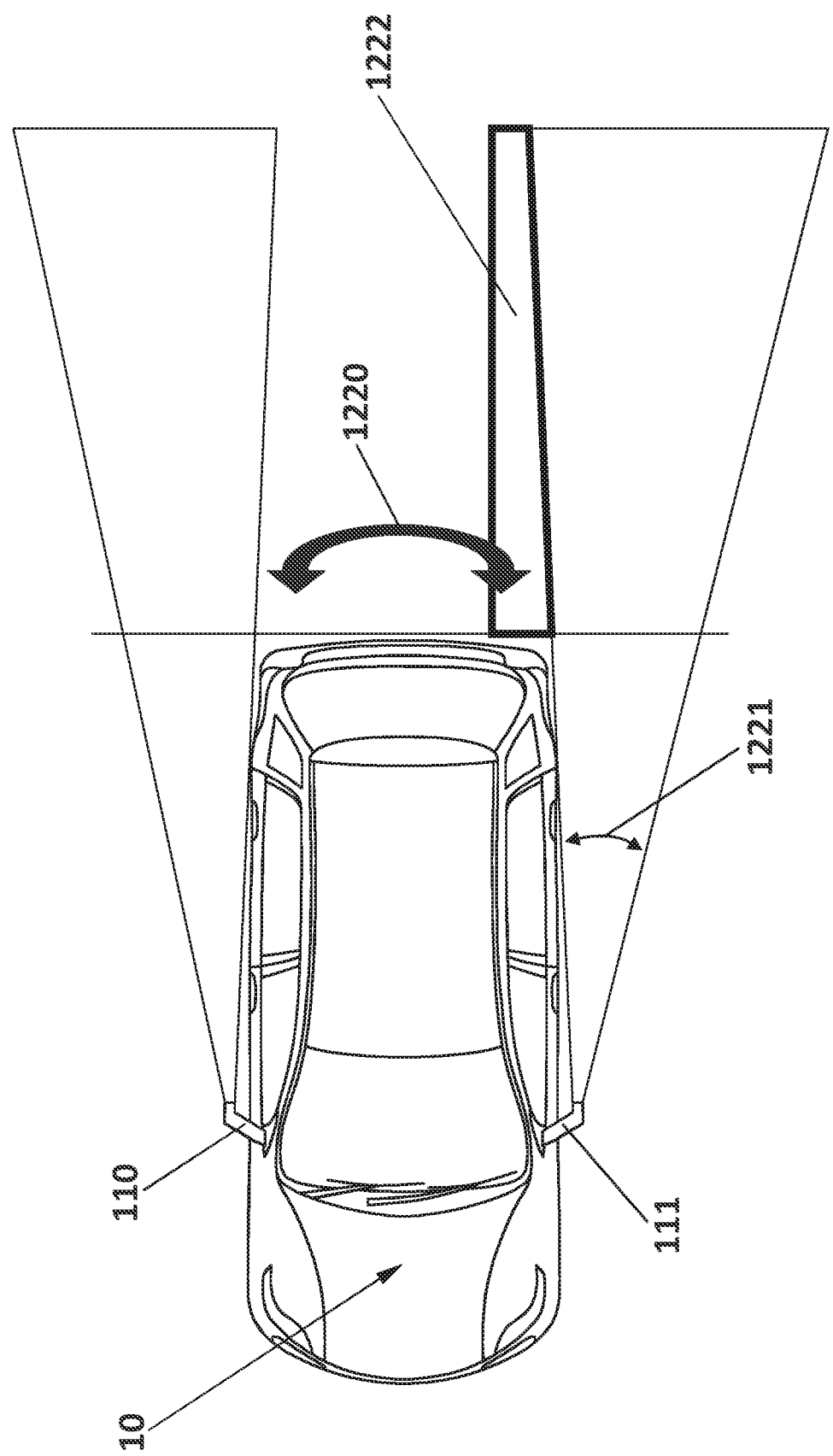
FIG. 14 shows the motor vehicle with different fields of views captured by external cameras of the vehicle.

Optionally, as shown for the left display device (101) and the right display device (100) in FIG. 12 and FIG. 13 respectively, the touch screen (200) presents a third additional image section (240), which shows the image captured by the rear camera (1400), displayed at the side opposite to the image region (210, 211) of the image captured by the respective external CMS cameras (1102, 1112). This third additional image section (240, 241) allows the driver to see behind the vehicle through the display devices (100, 101) associated with the exterior rear-view mirrors (110, 111), which minimizes the number of displays required. According to a further example, the third additional image section (240) is shown on the second portion (2002) of the display device. Also, the driver can see the adjacent area (1222) of the "side zone view", i.e., the zone between the "rear zone" (1220) and the "side zone" (1221), as shown in FIG. 14, in a "single" image on the driver's display, typically the one associated with the left exterior rear-view mirror (111).

According to a variation of the previous embodiment, in the case that the rear camera (1400) is left without an image to be displayed in the second portion of the display devices (100, 101), the image from the corresponding top view camera (1101, 1111) of the display devices (100, 101) can be taken. This is useful when the image region (210, 211), as being moved inside the captured image, can reach an edge (extreme) of the captured image. In this case, since the image region (210, 211) is shown on the first portion (2001), there is no image to be shown on the second portion (2002); however, when this happens, the ECU (500) detects it and selects the "top view" image to be shown on the second portion (2002). The ECU (500) can select: (i) the top view of the top-view camera of a single CMS device; or (ii) the top-view of the surrounding view, that is, after doing the "stitching" of the four top-view images from left, right, front and rear cameras. Optionally, instead of showing the top-view, the image from the area (1222) captured by the rear camera (1400), i.e., it is not all the rear image, but the portion of the adjacent/complementary rear image, can be displayed on the second portion (2002) or second screen (400).

In a possible embodiment, the display devices (100, 101, 102) can be controlled by the user, driver or co-driver, from a smartphone or tablet, e.g., via Bluetooth. The CMS can automatically load the settings previously input by the driver (i.e., user preferences of the device owner: default position, views . . . ) into his/her smartphone or tablet to the ECU (500).

In a further embodiment, the controller or ECU (500) of the CMS is configured also to receive and process vehicle driving and/or user information, and the image region (210, 211) is moved within the captured image depending on said received information. The vehicle driving information at least corresponds to a change in driving direction from a forward driving direction to a reverse driving direction or vice versa, an increase or decrease in driving speed with respect to a predefined driving speed value, a lane change, a change in steering angle, a change in pitch angle, a change in roll angle, and road monitoring information.

In an example, the ECU (500) is further configured to:
move the image region (210, 211) corresponding to a downward vertical displacement such that the field of view, FOV, is vertically displaced in a downward direction, when the driving direction is changed from a forward driving direction to a reverse driving direction, and move the image region (210, 211) corresponding to an upward vertical displacement such that the field of view, FOV, is vertically displaced in an upward direction, when the driving direction is changed from a reverse driving direction to a forward driving direction.

In a further example, the ECU (500) is configured to determine a relative upward and downward movement of the exterior rear-view mirror (110, 111) from a change in the pitch angle value, and further configured to:

move the image region (210, 211) corresponding to a downward vertical displacement such that the field of view, FOV, is vertically displaced in a downward direction, when the exterior rear-view mirror (110, 111) is downwardly moved, and move the image region (210, 211) corresponding to an upward vertical displacement such that the field of view, FOV, is vertically displaced in an upward direction, when the exterior rear-view mirror (110, 111) is upwardly moved.

In a further example, the ECU (500) is configured to receive a lateral displacement of the vehicle, for example, by a change in the steering angle value, and further configured to:

move the image region (210, 211) corresponding to a rightward lateral displacement such that the field of view is laterally displaced in a leftward direction in the event of a left lane change, and move the image region (210, 211) corresponding to a leftward lateral displacement such that the field of view is laterally displaced in a rightward direction in the event of a right lane change.

In a further example, the ECU (500) is configured to move the image region (210, 211) such that the zoom of the displayed image increases when the driving speed is increased and such that it surpasses the predefined driving speed value, while the image region area is decreased when the vehicle speed falls below a predefined driving speed value. Thus, a smaller part of the captured image is selected as image region (210, 211), and then an enlarged image is displayed when over speed is detected by the ECU (500). In this way, the driver has a better view of the area of interest, which in this case, corresponds to a more detailed view of the farthest area from the vehicle.

Preferably, the ECU (500) is configured to receive an activation signal such a blinker, and further configured to move the image region (210, 211) upon receiving said activation signal.

In a further embodiment, the CMS can work with speed or other measurements (e.g., if the reverse gear is engaged in parking situations) obtained from the CAN, or another network (e.g., Ethernet, etc.) which the ECU (500) is communicated with. The same measured speed signal can be used to adjust the FOV of the entire system in the vehicle (10), shown in FIGS. 1 and 6, comprising: a "right CMS" corresponding to the camera/s or image processing means (1102) associated with the right left exterior rear-view mirror (110, 111), a "left CMS" corresponding to the camera/s or image processing means (1112) associated with the left exterior rear-view mirror (111) and an intelligent interior rear-view mirror system or IRMS associated with the interior rear-view mirror (112). The IRMS and the CMSs are controlled by the same ECU (500). The ECU (500) can be configured to compare current images with previous images to act as a "back up" in case the CAN does not work (because there are wireless cameras that cannot be physically connected to the CAN, or because the CAN is damaged or because there are values that are not transmitted correctly through the CAN). Furthermore, the CMS can store images in case of accident detection. The ECU (500) can be connected to the CAN of the car and the CAN itself that determines when there is an accident or not. Alternatively, the ECU (500) also comprises accident detection means. Generally said accident detection means comprise an accelerometer. This accelerometer is configured so that it never jumps in maximum acceleration of the car or a braking, but when there is a shock where the deceleration is greater. In any case, the images are not hidden with overlays of digital buttons.

The driver can adjust the FOV of the IRMS through the "touch & drag", preferably provided by the second portion (2002) of the CMS display device (100, 101, 102). While traditional central rear-view mirrors are tilted because the driver is on the left side of the car and wants to see what is behind, the interior mirrors of the IRMS, which provides the driver with a display showing the image of the rear camera (1400), are centered. There is no option to turn the rear-view mirror in the IRMS, but the driver can perform a "crop & pan" of the rear camera through the "touch & drag" functionality in the second portion (2002). In "crop & pan" functionality of the IRMS, the rear camera (1400) captures an image, in which a controller-either a single ECU of the vehicle, any of the CMS's ECUs (500), or the IRMS's ECU-selects a portion of the image or "image region" that appears on the IRMS display.

According to another preferred embodiment, the CMS comprises, as alternative to the before described approach based on a control surface of the touch screen or in addition to it, a gesture detector so as, for example, to move the image region within the image captured by the exterior image capturing means by gestures of the driver's fingers or to allow the driver command the CMS to expand the FOV by a head movement. There are three implementation options for the gesture detector:

i) In a possible embodiment, gestures can be recognized in images of the user captured by an additional camera inside the vehicle (10), for example, near the user's display or in the interior mirror, and the ECU is configured to use an image classifier by to avoid false positives and false negatives in the detected gestures ii) In another possible embodiment, no extra camera is needed, the gestures are performed on the display without touching it and they are detected by simply increasing the capacity sensibility of its screen.

iii) A further possible embodiment is based on electrical near-field (E-field) 3D gesture controllers that enable user gesture detection and motion tracking by using a single-chip device with no host processing needed for embedded applications. Thus, only by turning his/her head or waving one hand, the CMS detects that the driver wants an opening (greater) of his/her FOV, and consequently increases the FOV of the external camera. Therefore, this preferred embodiment provides multiple possible locations from which the driver can make the movements.

In another embodiment of the CMS using a gesture detector, the crop-and-pan functionality may be triggered by a driver's head movement. The driver's head movement may be tracked by a surveillance system, which is preferably within the vehicle, more preferably fixed (i) in front of the driver, or (ii) in the interior rear-view mirror, (iii) or near to the CMS display device. Preferably, the driver surveillance system may comprise a camera. The surveillance system may be capable of working out the position and distance of the driver's head. Thus, the image region (210, 211) within the captured image may be manually controlled (e.g., by screen sliding command o by the touch-and-drag functionality), but also by the driver's head moving forward when this movement is captured by the gesture detector.

Note that in this text, the term "comprises" and its derivations (such as "comprising", etc.) should not be understood in an excluding sense, that is, these terms should not be interpreted as excluding the possibility that what is described and defined may include further elements, steps, etc.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A camera monitoring system for motor vehicles, comprising:
    image capturing means being associated with at least an exterior rear-view mirror of a vehicle, the exterior rear-view mirror being a mounting assembly located at an exterior part of the vehicle, the image capturing means being located at the mounting assembly and configured to capture an image from an exterior field of view of the vehicle, wherein the field of view extends at least sideward and rearward outside the vehicle and encompasses a portion of the exterior part of the vehicle;
    an electronic control unit (ECU) connected to the image capturing means, wherein the ECU is configured to select an image region from the image captured by the image capturing means, the image region being smaller than the captured image and movable within the captured image; and
    at least one display device including at least a first screen located inside the vehicle and connected to the ECU, wherein the first screen is a touch screen,
    wherein the at least one display device comprises:
    a first portion of the display device in which a touch-and-drag operation of the captured image is not enabled; and
    a second portion of the display device in which the touch-and-drag operation is provided by the touch screen acting as a control surface configured both to move the image region within the captured image displayed in the second portion and simultaneously shift the field of view (FOV) to pan the captured image in the first portion of the at least one display device along one of a vertical plane and a horizontal plane via the touch-and-drag operation performed in the second portion.

2. The camera monitoring system according to claim 1, wherein further comprising a frame covering partially the touch screen to split the at least one display device into at least the first portion and the second portion.

3. The camera monitoring system according to claim 2, wherein the frame is partially tinted and comprises at least one non-tinted portion corresponding to the second portion of the first display device.

4. The camera monitoring system according to claim 3, wherein the frame comprises two non-tinted portions, a first non-tinted portion corresponding to the second portion displaying the image region adjustable in size or location on the touch screen by a user's touch and a second non-tinted portion corresponding to the second portion displaying control items to control parameters through the control surface of the touch screen.

5. The camera monitoring system according to claim 2, wherein the parameters to be controlled through the control surface of the touch screen are selected from brightness, contrast and color parameters of the image region displayed by the display device.

6. The camera monitoring system according to claim 4, wherein the parameters to be controlled through the control surface of the touch screen are selected from brightness, contrast and color parameters of the image region displayed by the display device.

7. The camera monitoring system according to claim 2, wherein the parameters to be controlled through the control surface of the touch screen are selected from height of the field of view of the image capturing means and width of the field of view of the image capturing means.

8. The camera monitoring system according to claim 6, wherein the parameters to be controlled through the control surface of the touch screen are selected from height of the field of view of the image capturing means and width of the field of view of the image capturing means.

9. The camera monitoring system according to claim 2, wherein the control items are selected from buttons drawn on the frame, digital buttons, and digital menus.

10. The camera monitoring system according to claim 8, wherein the control items are selected from buttons drawn on the frame, digital buttons and digital menus.

11. The camera monitoring system according to claim 1, wherein the first portion and the second portion of the at least one display device are the same touch screen.

12. The camera monitoring system according to claim 10, wherein the first portion and the second portion of the at least one display device are the same touch screen.

13. The camera monitoring system according to claim 1, wherein the at least one display device comprises a first screen which is touch sensitive and a second screen which is not touch-sensitive and the first portion of the display device being defined by the second screen and the second portion of the display device is defined by the first screen.

14. The camera monitoring system according to claim 10, wherein the display device further comprises a first screen which is touch sensitive and a second screen which is not touch-sensitive, wherein the first portion of the at least one display device is defined by the second screen and the second portion of the at least one display device is defined by the first screen.

15. The camera monitoring system according to claim 1, further comprising an additional camera inside the vehicle configured to capture driver's gestures and the gesture detector is implemented by the ECU using an image classifier.

16. The camera monitoring system according to claim 1, wherein the gesture detector is implemented by a touch-sensitive screen with increased capacity sensibility of the display device.

17. The camera monitoring system according to claim 1, wherein the gesture detector is implemented by an electronic device based on electrical near-field gesture controllers.

18. The camera monitoring system according to claim 1, wherein the image capturing means are fixedly located outside the vehicle.

19. The camera monitoring system according to claim 1, wherein the ECU adjusts a magnification of the image region based on vehicle speed.

20. The camera monitoring system according to claim 1, wherein the image region is further displayed on the second portion of the at least one display device.

21. A camera monitoring system for motor vehicles, comprising:

image capturing means being associated with at least an exterior rear-view mirror of a vehicle, the exterior rear-view mirror being a mounting assembly located at an exterior part of the vehicle, the image capturing means being located at the mounting assembly and configured to capture an image from an exterior field of view of the vehicle, wherein the field of view extends at least sideward and rearward outside the vehicle and encompasses a portion of the exterior part of the vehicle;

an electronic control unit (ECU) connected to the image capturing means, wherein the ECU is configured to select an image region from the image captured by the image capturing means, the image region being smaller than the captured image and movable within the captured image; and at least one display device including at least a first screen located inside the vehicle and connected to the ECU, wherein the first screen is a touch screen, wherein the at least one display device comprises:

a frame including a tinted portion and a non-tinted portion, the tinted portion restricting transmission of light from the display device, wherein the tinted portion defines a first portion of the display device in which a touch-and-drag operation of the captured image is not enabled, and the non-tinted portion defines a second portion of the display device in which the touch-and-drag operation is provided by the touch screen acting as a control surface configured both to displace the field of view (FOV) of the image region to simultaneously pan the captured image displayed at least by the first portion of the at least one, display device along one of a vertical plane and a horizontal plane via the touch-and-drag operation in the second portion.

\* \* \* \* \*